Patented Aug. 29, 1933

1,924,566

UNITED STATES PATENT OFFICE 1,924,566

VULCANIZATION ACCELERATOR

Ludwig Orthner, Leverkusen-I. G. Werk, Ewald Zaucker and Max Bögemann, Cologne-Mulheim-on-the-Rhine, Germany, assignors to I. G. Farbenindustrie Aktiengesellschaft, Frankfort-on-the-Main, Germany No Drawing. Application September 16, 1932, Serial No. 633,454, and in Germany September 17, 1931

18 Claims. (Cl. 18—53)

The present invention relates to new vulcanization accelerators, to a process of vulcanizing rubber and to the vulcanization products obtainable by the said process.

Compounds containing the grouping

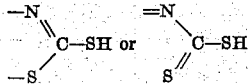

or the salts thereof, such as mercaptoarylene thiazoles or dithiocarbamates, are known to be valuable vulcanization accelerators. They have, however, the disadvantage of a rather low critical temperature.

It is the main object of our invention to provide vulcanization accelerators of the above classes possessing a substantially better critical temperature.

The accelerators which we have found to possess the desired property are those obtainable by esterifying the sulfhydryl group of compounds containing the above mentioned groupings by an aryl radical containing a nitro group and, in meta-position to the nitro group the group $$O=\overset{|}{C}-x,$$

wherein $x$ means hydrogen, a substituted or unsubstituted alkyl-, aryl-, aralkyl-, alkoxy- or hydroaryl radical or a substituted or unsubstituted amino group.

The new accelerators may be prepared, for example, by reacting upon accelerators containing one of the groupings:—

or a salt thereof with a nitro halogen aryl compound containing a nitro group and a halogen atom in ortho- or para-position to one another and the grouping

in meta-position to the nitro group.

Suitable sulfhydryl compounds, are, for example, mercapto arylene thiazoles, such as 2-mercaptobenzothiazole, 2-mercapto-1'.2'-naphthothiazole, which compounds may be substituted by monovalent substituents, such as halogen atoms (chlorine or bromine, for example), nitro groups, amino-, alkyl-, aryl- or alkoxy groups (methyl-, ethyl-, butyl-, phenyl-, amino-, di-methylamino-, methoxy-, ethoxy groups etc.). Further suitable sulfhydryl compounds are dithiocarbamates derived from secondary amines, such as dimethylamine, diethylamine, methyl-ethylamine, dibenzylamine, ethylcyclohexylamine, dicyclohexylamine, N-methylaniline, piperidine, morpholine, thiomorpholine, hexahydrocarbazole etc.

Suitable nitro halogenaryl compounds are, for example:—3-nitro-4-chlorobenzaldehyde, 3.3'-dinitro-4.4'-dichlorobenzophenone, 3-nitro-4-chlorobenzoic acid-methylester, 2-chloro-5-nitro-benzoic acid cyclohexylester, 2-chloro-5-nitro-benzpiperidide, 2-chloro-5-nitroacetophenone, and 2-chloro-5-nitrobenzoic acid butylamide.

For the manufacture of the new accelerators a salt of the sulfhydryl compound may be caused to react with the nitro halogen aryl compound in an aqueous medium or in the presence of a suitable organic solvent, such as alcohol, acetone, etc., while gently heating the reaction mixture. For example, when boiling a mixture of molecular proportions of the sodium salt of 2-mercaptobenzothiazole and of 2-chloro-5-nitrobenzoic acid butylamide in acetone solution, a reaction product is obtained according to the following probable equation:—

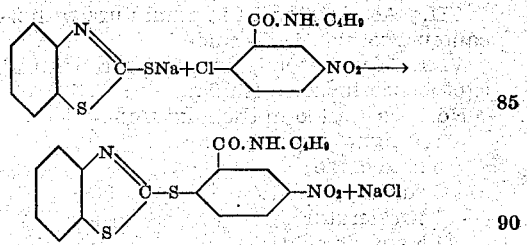

According to the same method the potassium salt of dimethyldithiocarbamic acid and 3-nitro-4-chlorobenzoic acid methylester react with one another according to the following equation:—

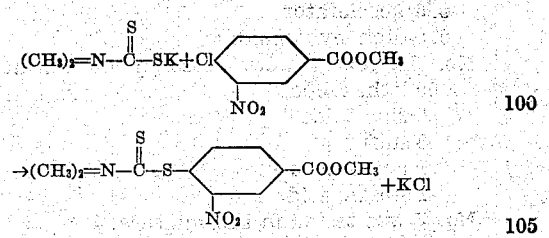

The new accelerators are generally yellowish crystalline compounds soluble in the usual organic solvents. As outlined above, they possess a good critical temperature. They, furthermore, possess a strong accelerating action and have the advantage of not decolorizing the vulcanization products to any substantial degree.

For vulcanization purposes the new accelerators may be incorporated within the rubber to be vulcanized in any desired manner, for example, by rolling or kneading or other mechanical means. A vulcanizing agent, such as sulfur, compounds being capable to split off sulfur, selenium, aromatic nitro compounds + metal oxides etc. are likewise incorporated within the vulcanization mixture, and, if desired, filling materials, (lamp black, zinc oxide, magnesium oxide, talcum, for example), pigments, softeners, antiperishing agents, etc. The mixtures thus obtainable are then vulcanized in the usual manner, for example, by heating the same to a temperature between about 120–200° C. Hard and soft rubber vulcanization products of great technical value can thus be obtained. In some cases it will be of advantage to add to the vulcanization mixtures, besides the new accelerators, accelerators of other types, such as diphenylguanidine, dibutylamine, ortho-tolylbiguanide tetramethylthiuramdisulfide, 2-mercaptobenzothiazoledisulfide, etc.

The following examples illustrate the invention, without limiting it thereto:—

*Example 1*

Accelerators tested:—
The reaction products of
I. 2-mercaptobenzothiazole with 3-nitro-4-chlorobenzaldehyde
II. 2-mercaptobenzothiazole with 2-chloro-5-nitrobenzoic acid butylamide
III. The sodium salt of dimethyldithiocarbamic acid with 3-chloro-4-nitrobenzaldehyde
IV. The sodium salt of dimethyldithiocarbamic acid with 3-nitro-4-chlorobenzoic acid-methylester
V. The sodium salt of pentamethylene-dithiocarbamic acid with 3-nitro-4-chlorobenzoic acid methylester
VI. Accelerator I in admixture with diphenylguanidine
VII. Accelerator III in admixture with 2-mercaptobenzothiazole disulfide
VIII. Accelerator IV in admixture with 2-mercaptobenzothiazole disulfide.

No. I was tested in the mixture:—
  100 light crepe
  5 zinc oxide
  3 sulfur
  1 accelerator
  1.5 stearic acid.
No. II was tested in the mixture:—
  100 light crepe
  5 zinc oxide
  3 sulfur
  0.5 accelerator
  0.5 diphenylguanidine.
No. III, No. IV were tested in the mixture:—
  100 light crepe
  5 zinc oxide
  3 sulfur
  1 accelerator
  1 stearic acid
No. V was tested in the mixture:—
  100 light crepe
  5 zinc oxide
  2.5 sulfur
  1 accelerator
  1 stearic acid No. VI was tested in the mixture:—
  100 light crepe
  5 zinc oxide
  2.5 sulfur
  0.4 accelerator
  0.6 diphenylguanidine.
No. VII was tested in the mixture:—
  100 light crepe
  5 zinc oxide
  2.5 sulfur
  0.75 accelerator
  0.25 2-mercaptobenzothiazoledisulfide.
No. VIII was tested in the mixture:—
  100 light crepe
  5 zinc oxide
  2.5 sulfur
  0.5 accelerator
  0.5 2-mercaptobenzothiazoledisulfide.

(The figures given above refer to parts by weight.)

In the vulcanization tests the following values were obtained:—
$a$ = tensile strength in kg/cm$^2$
$b$ = stretch in %.

| Heating 110° C. | I | | II | | III | | IV | |
|---|---|---|---|---|---|---|---|---|
| | a | b | a | b | a | b | a | b |
| 30 min | | | | | | | | |
| 45 min | | | | | 88 | 1003 | | |
| 60 min | | | 31 | 1100 | 204 | 900 | 102 | 1120 |
| 143° C. | | | | | | | | |
| 10 min | | | 127 | 1000 | 192 | 835 | 160 | 955 |
| 20 min | 89 | 1020 | 133 | 850 | 152 | 733 | 231 | 810 |
| 45 min | 161 | 910 | 226 | 760 | 127 | 740 | 171 | 820 |

| Heating 110° C. | V | | VI | | VII | | VIII | |
|---|---|---|---|---|---|---|---|---|
| | a | b | a | b | a | b | a | b |
| 30 min | | | 6 | 866 | | | | |
| 45 min | | | 33 | 1070 | | | | |
| 60 min | 16 | 1040 | 81 | 955 | 86 | 940 | | |
| 143° C. | | | | | | | | |
| 10 min | 96 | 970 | 180 | 875 | 192 | 755 | 186 | 875 |
| 20 min | 149 | 825 | 225 | 805 | 149 | 735 | 202 | 790 |
| 45 min | 179 | 860 | 220 | 805 | 130 | 740 | 183 | 795 |

*Example 2*

Accelerators tested:—
I. The reaction product of 3-nitro-4-chlorobenzaldehyde with pentamethylene-dithiocarbamate
II. The reaction product of 3-nitro-4-chlorobenzoic acid methylester with ethylcyclohexyl-dithiocarbamate.
III. The reaction product of 3-nitro-4-chlorobenzoic acid methylester with dicyclohexyl-dithiocarbamate
IV. Accelerator I in admixture with dibenzothiazyl-2.2'-disulfide
V. Accelerator II in admixture with dibenzothiazyl-2.2'-disulfide.

Nos. I and II were tested in the mixture:—
  100 light crepe
  5 zinc oxide
  3 sulfur
  1 stearic acid
  1 accelerator.

No. III, IV, and V were tested in the mixture:—
- 100 light crepe
- 5 zinc oxide
- 3 sulfur
- 1 stearic acid
- 0.75 accelerator
- 0.25 dibenzothiazyl-2.2'-disulfide.

(The figures given above refer to parts by weight.)
In the vulcanization tests the following values were obtained:—
$a$=Tensile strength in kg/cm$^2$
$b$=Stretch in %.

| Heating, 110° C. | I | | II | | III | | IV | | V | |
|---|---|---|---|---|---|---|---|---|---|---|
| | a | b | a | b | a | b | a | b | a | b |
| 30 min | | | | | | | | | | |
| 60 min | 208 | 935 | | | | | 39 | 915 | | |
| 126.7° C. | | | | | | | | | | |
| 30 min | 186 | 780 | 6 | 620 | 77 | 1090 | 183 | 700 | 133 | 955 |
| 60 min | 208 | 720 | 112 | 962 | 155 | 975 | 183 | 715 | 186 | 810 |
| 143° C. | | | | | | | | | | |
| 10 min | 211 | 870 | 37 | 1027 | 84 | 1065 | 229 | 770 | 136 | 935 |
| 30 min | 213 | 765 | 136 | 950 | 143 | 945 | 180 | 765 | 177 | 850 |

In these examples the natural rubber applied may be replaced with a good result by artificial rubber-like masses, as are obtainable, for example, by polymerizing butadiene, isoprene, 2.3-dimethyl-butadiene or other rubber-forming hydrocarbons, either alone or in admixture with one another or with other suitable polymerizable compounds, such as styrene, vinylnaphthalenes, acrylic acid derivatives, unsaturated ketones etc. Therefore, when using in the claims the term "rubber" the same is intended to include natural rubber and artificial rubber-like masses as mentioned above.

We claim:—

1. Vulcanization accelerators consisting of compounds containing one of the tautomeric groupings:—

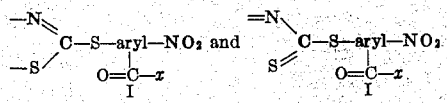

wherein the NO$_2$ group stands in ortho- or para-position to the sulfur atom and in meta position to the carbon atom marked I, and wherein $x$ means hydrogen, an alkyl-, aryl-, aralkyl-, alkoxy-, hydroaryl- or amino group.

2. Vulcanization accelerators consisting of compounds of the probable formula:—

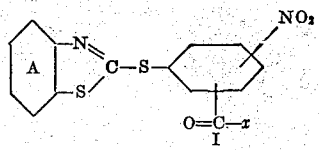

wherein the NO$_2$ group stands in ortho- or para-position to the sulfur atom and in meta-position to the carbon atom marked I, and wherein $x$ means hydrogen, an alkyl-, aryl-, aralkyl-, alkoxy-, hydroaryl- or amino group, and wherein the nucleus marked A may be substituted by monovalent substituents.

3. Vulcanization accelerators consisting of compounds of the probable formula:—

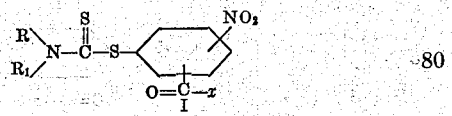

wherein the group

is the radical of a secondary amine, the NO$_2$ group stands in ortho- or para-position to the sulfur atom and in meta position to the carbon atom marked I, and $x$ stands for hydrogen, an alkyl-, aryl, aralkyl-, alkoxy-, hydroaryl- or amino group.

4. The vulcanization accelerator of the probable formula:—

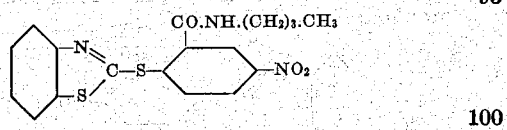

5. The vulcanization accelerator of the probable formula:—

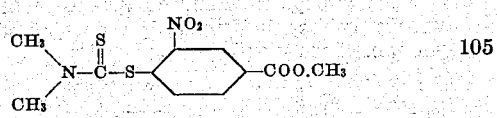

6. The vulcanization accelerator of the probable formula:—

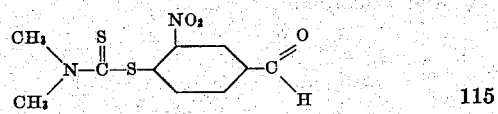

7. The process which comprises incorporating within rubber a vulcanizing agent and a vulcanization accelerator containing one of the tautomeric groupings:—

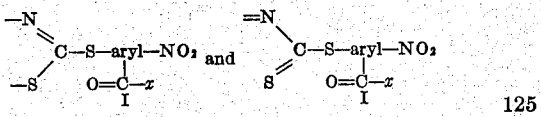

wherein the NO$_2$ group stands in ortho- or para-position to the sulfur atom and in meta-position to the carbon atom marked I, and wherein $x$ means hydrogen, an alkyl-, aryl-, aralkyl-, alkoxy-, hydroaryl- or amino group, and vulcanizing the mixture.

8. The process which comprises incorporating within rubber sulfur and a compound of the probable formula:—

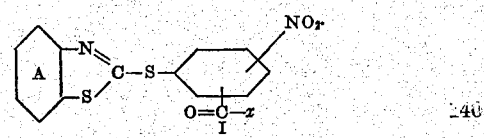

wherein the NO$_2$ group stands in ortho- or para-position to the sulfur atom and in meta-position to the carbon atom marked I, wherein $x$ means hydrogen, an alkyl-, aryl-, aralkyl, alkoxy-, hydroaryl- or amino group, and wherein the nucleus marked I may be substituted by monovalent substituents, and vulcanizing the mixture.

9. The process which comprises incorporating within rubber sulfur and a compound of the probable formula:—

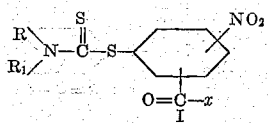

wherein the group

is the radical of a secondary amine, the NO₂ group stands in ortho- or para-position to the sulfur atom and in meta-position to the carbon atom marked I, and $x$ stands for hydrogen, an alkyl-, aryl-, aralkyl-, alkoxy-, hydroaryl- or amino group, and vulcanzing the mixture.

10. The process which comprises incorporating within rubber sulfur and a compound of the probable formula:—

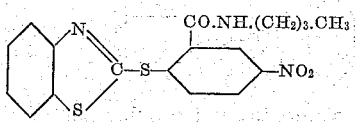

and vulcanizing the mixture.

11. The process which comprises incorporating within rubber sulfur and a compound of the probable formula:—

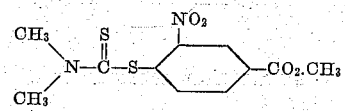

and vulcanizing the mixture.

12. The process which comprises incorporating within rubber sulfur and a compound of the probable formula:—

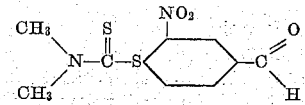

and vulcanizing the mixture.

13. The vulcanization products obtained according to the process claimed in claim 7.

14. The vulcanization products obtained according to the process claimed in claim 8.

15. The vulcanization products obtained according to the process claimed in claim 9.

16. The vulcanization products obtained according to the process claimed in claim 10.

17. The vulcanization products obtained according to the process claimed in claim 11.

18. The vulcanization products obtained according to the process claimed in claim 12.

LUDWIG ORTHNER.
EWALD ZAUCKER.
MAX BÖGEMANN.